No. 779,957. PATENTED JAN. 10, 1905.
A. M. MINTER.
SCISSORS.
APPLICATION FILED JAN. 22, 1904.
Fig. 1.
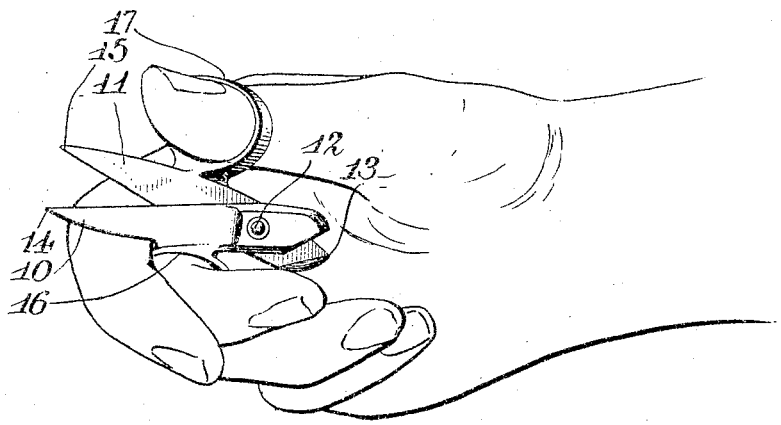
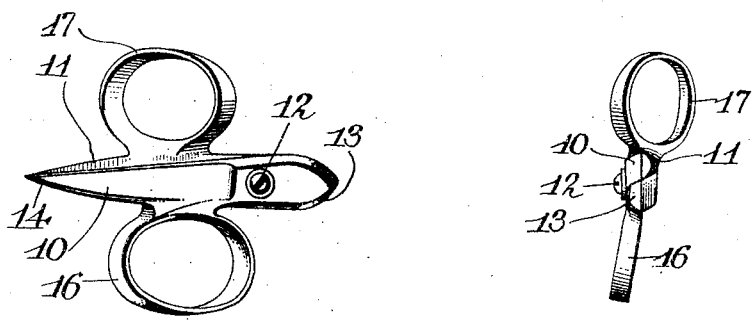
Fig. 2. Fig. 3.
Witnesses
E. K. Stewart
C. N. Woodward
Allie M. Minter,
Inventor
by C. A. Snow & Co.
Attorneys No. 779,957.

Patented January 10, 1905.

UNITED STATES PATENT OFFICE.

ALLIE M. MINTER, OF BRIDGEPORT, CONNECTICUT.

SCISSORS.

SPECIFICATION forming part of Letters Patent No. 779,957, dated January 10, 1905.

Application filed January 22, 1904. Serial No. 190,213.

*To all whom it may concern:*

Be it known that I, ALLIE M. MINTER, a citizen of the United States, residing at Bridgeport, in the county of Fairfield and State of Connecticut, have invented a new and useful Scissors, of which the following is a specification.

This invention relates to scissors employed for severing various materials, more particularly for the use of seamstresses and others in manufacturing and repairing garments, and has for its object to produce a compact and convenient implement of this character which may be operated by the thumb and finger of one hand and easily controlled thereby.

With this and other objects in view, as will appear as the nature of the invention is better understood, the same consists in certain novel features of construction, as hereinafter shown and described, and specified in the claim.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes may be made in the form, size, and proportions and in the general assemblage of parts without departing from the principle of the invention or sacrificing any of its advantages. The right is therefore reserved of making such changes and modifications therein as may fall within the scope of the invention and the claim made therefor.

In the drawings thus employed, Figure 1 is a perspective view of the device applied. Fig. 2 is a side view, and Fig. 3 is an end view of the device detached.

The improved device comprises a pair of shear-blades 10 11, united by a pivot 12 near one end, and with a stop 13, integral with one of the blades, projecting over the other blade to limit the movement in one direction or to prevent the points 14 15 overlapping when the blades are closed.

Carried by one of the blades, 10, which will be the lower one in use, is a finger-loop 16, which is disposed approximately in parallelism with its blade, and carried by the other blade, 11, which will be the upper one in use, is a similar finger-loop 17, which is disposed obliquely to its blade. These loops may be either formed integral with the blades or be brazed or otherwise secured thereto; but under all circumstances they will be rigid and non-yielding with relation to the blades. The loops will be disposed opposite each other and between the pivots and points of the blades, and when in operation the middle finger will engage the lower loop 16, and the thumb of the same hand will engage the upper loop 17, with the forefinger beneath the lower blade 10 and bearing against the forward side of the finger-engaging loop 16. The lower loop 16 will preferably be slightly inclined, as shown in Fig. 3. By this simple means the shearing-blades may be perfectly controlled and operated with ease and precision, each blade being positively operated both in opening and closing and without the use of springs or other extraneous attachments for assisting in the operation.

The device will be found of special advantage in ripping seams, in repairing and remodeling garments, but may be employed for other purposes to which it is adapted.

Having thus described the invention, what is claimed is—

A pair of shears having its blades provided each with a finger-loop rigid therewith and located intermediate of its ends, one of the loops being disposed parallel with its blade and the other loop obliquely to its blade, a pivot disposed in rear of the loops, a stop projecting at right angles to the terminal of one of the blades, and an extension on the other blade to engage the stop.

In testimony that I claim the foregoing as my own I have hereto affixed my signature in the presence of two witnesses.

ALLIE M. MINTER.

Witnesses:
 ADA S. WOOTTON,
 BACON WAKEMAN.